May 18, 1937. B. KELLEY 2,081,009
PRESSURE FILTER
Filed May 13, 1935 3 Sheets-Sheet 1
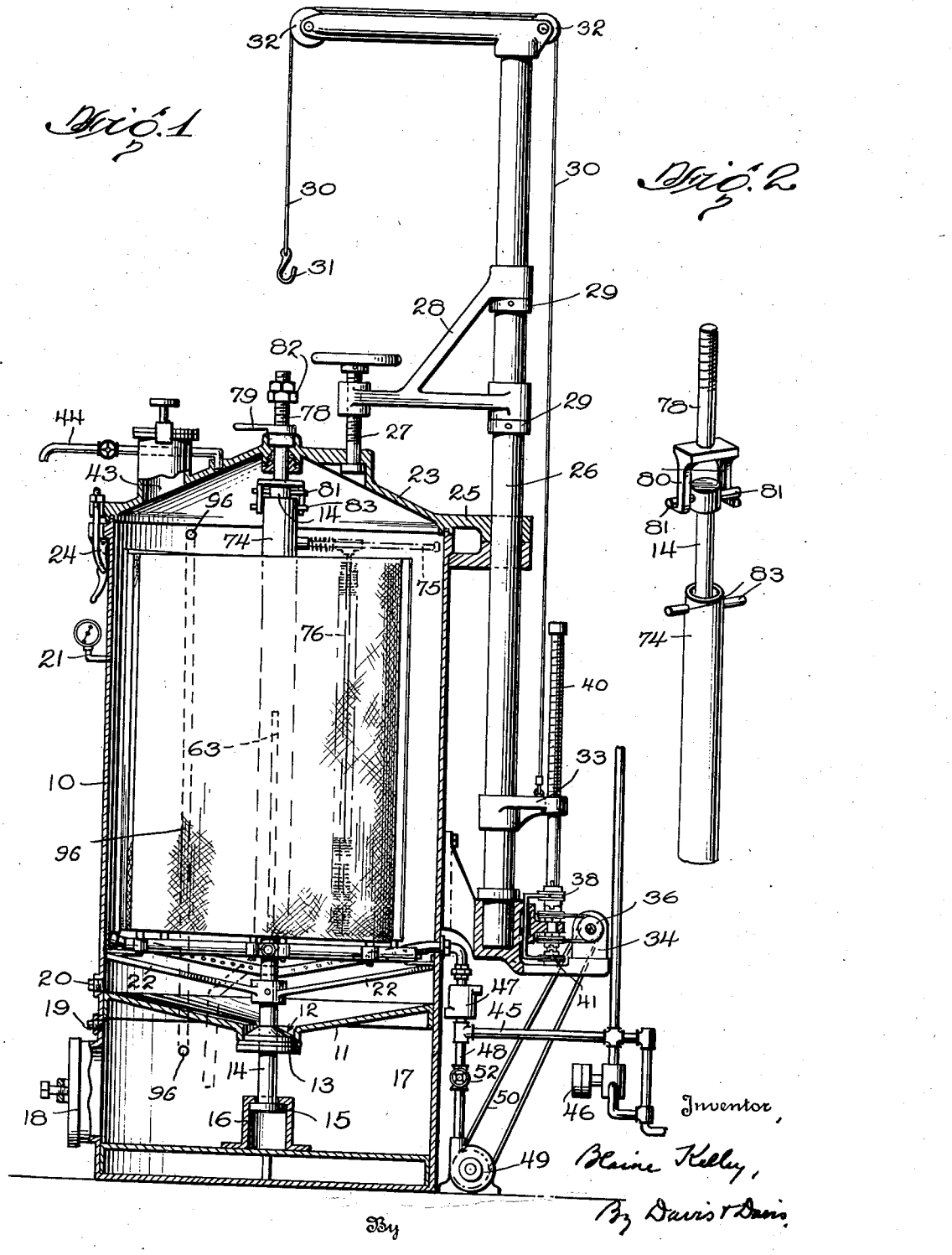

May 18, 1937.　　　　　B. KELLEY　　　　　2,081,009
PRESSURE FILTER
Filed May 13, 1935　　　　3 Sheets-Sheet 2
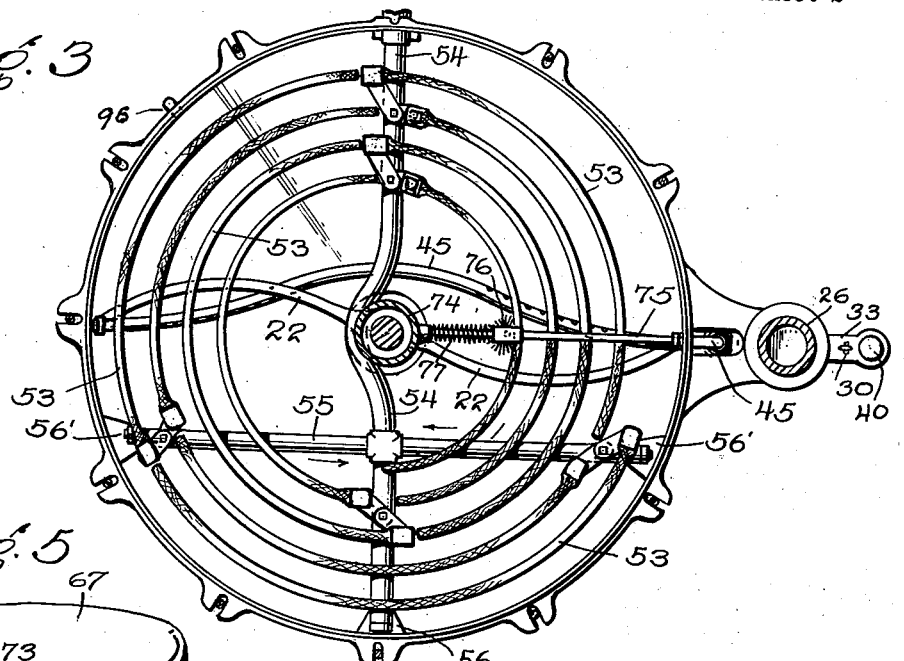
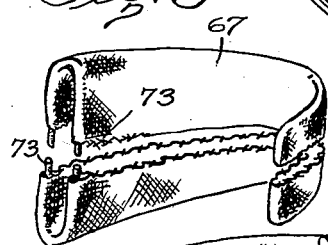
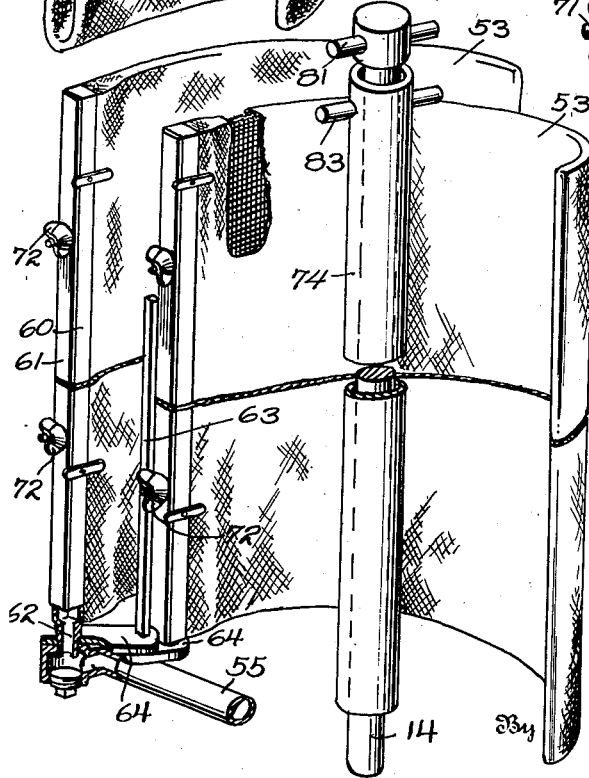
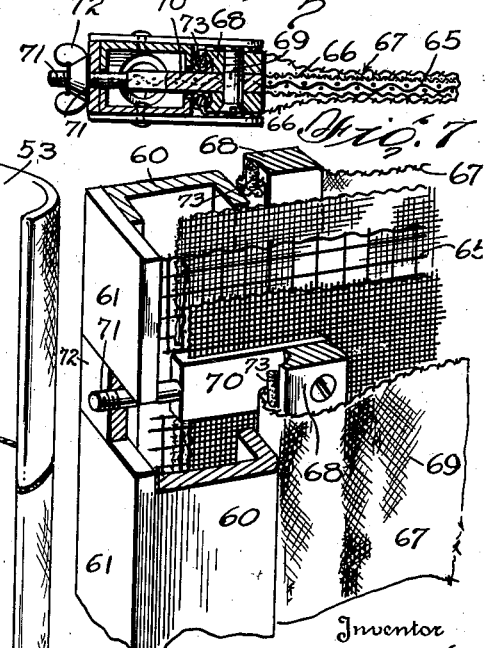
Inventor
Blaine Kelley,
By Davis & Davis
Attorneys

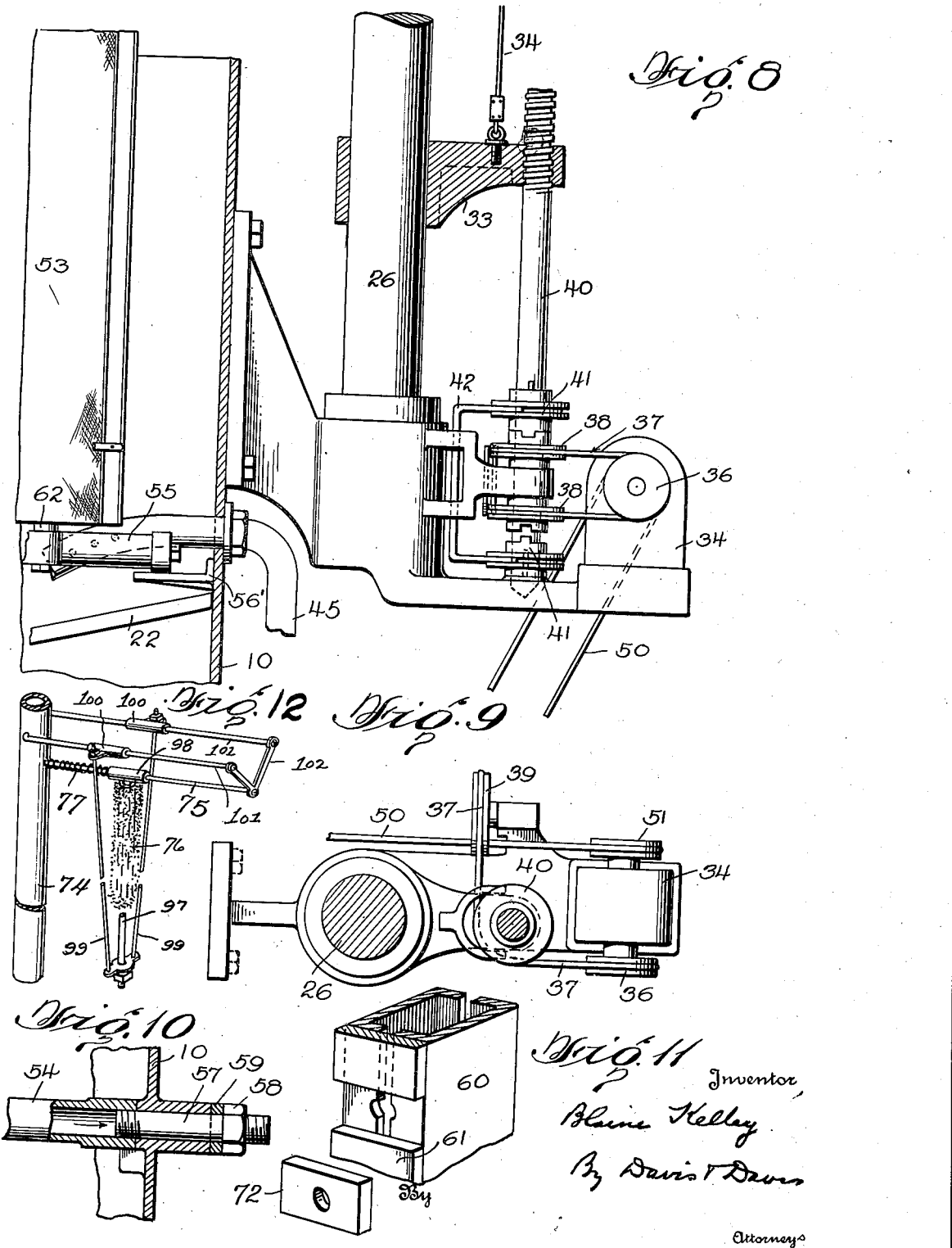

Patented May 18, 1937

2,081,009

UNITED STATES PATENT OFFICE 2,081,009

PRESSURE FILTER

Blaine Kelley, Charlotte, N. C.

Application May 13, 1935, Serial No. 21,244

10 Claims. (Cl. 210—182)

This invention relates to that type of pressure filters particularly adapted for cleaning the liquid solvent used in the dry cleaning trade. One example of this type of filter is shown in my patent dated May 7, 1935, and numbered 2,000,137. In this type of filter, a filter-aid is intimately mixed with the solvent and carried therewith under pressure through the filter, the filter-aid being deposited in the form of a coat upon a foraminous diaphragm in the filter chamber, the coating process continuing until a sufficiently thick filtering wall has been built up upon the foraminous diaphragm or screen, after which the filtering operation continues until the cake has acquired a resistance which renders further filtering operations impractical on account of the high pressure needed to force the solvent through the wall of the cake.

My present invention has the advantage of my patented invention above noted in that it permits the use of a much larger number of filtering surfaces, with consequent increased capacity for filtering in any given length of time. A further advantage is that provision is made for accumulation of used filter cake in a chamber below the regular filter chamber, provision being made for shutting off this sludge chamber from the filtering compartment while the filtering compartment is filled with fluid, so that any sludge which has been previously deposited in this sludge chamber may be withdrawn without emptying the filtering compartment of its cleaning liquid.

Another improvement embodied in the present invention consists in the use of a scraper device at the bottom of the filtering chamber for gathering the fallen, used cake and delivering it to the opening leading to the sludge chamber, this scraper or brush arrangement being capable of operation without draining the cleaning liquid from the filtering chamber proper.

A still further improvement consists in the use of a single brushing device so arranged as to remove spent filter cake from the filtering surfaces by simple rotary motion, this rotary cake removing device being so arranged that it will, in a simple operation, remove the spent cake from a multiple of surfaces.

A still further improvement consists in the use of an air-blower for the purpose of discharging air under pressure through a heating device to thereby dry out the filter cake while still in place on the grid, the advantage of this being obvious from the fact that it is well known that moisture in the cake is the principal cause of resistance to the flow of liquid through the filter cake, and that therefore the removal of this moisture by hot air allows continued use of the same filter cake without re-coating.

A still further improvement lies in the simple method of assembling the grids in place, together with a simplification of the individual grid construction, whereby a single opening only need be provided in the cloth cover for the insertion of the grids therein instead of the customary double opening. A feature of improvement in this grid construction is that the grids are slightly tapered so that the grid covers release easily from the grids or screen frames over which they are placed, although it will be understood that my invention is not limited to the use of cloth covered grids, as grids covered with finely-meshed screen may be used as alternative cake-receiving medium.

This invention has further, minor objects which will appear in the course of the specification.

In the drawings annexed,

Fig. 1 is a vertical sectional view of a pressure filter embodying one form of my invention;

Fig. 2 is a detail perspective view of parts of the device for depressing and actuating the scraper and for actuating the rotary brush for removing the cake from the grids;

Fig. 3 is a horizontal sectional view taken through the apparatus at a point above the grids and looking downwardly;

Figs. 4, 5, 6 and 7 are detail views of the preferred form of grid structure;

Fig. 8 is an enlarged detail side elevation showing the manner of supporting the grid structure as a whole and the means for raising the grid structure out of the filter tank as well as lowering it into the tank;

Fig. 9 is a horizontal sectional view, looking downwardly, showing the raising and lowering device of Fig. 8;

Fig. 10 is a vertical sectional view taken through the outlet of the grid structure;

Fig. 11 is a perspective view of another detail of the grid structure;

Fig. 12 is a detail perspective view of the brush used for removing the cakes from the grids.

Referring to the drawings annexed by reference characters, 10 designates the filtering tank whose circular bottom 11 is made conical so as to converge to a central opening 12. A circular valve 13 is adapted to tightly close against a depending flange around the opening 12 and thus close the filter at this point, said valve-disk being mounted rigidly on a tubular rod 14 extending upwardly into the filter chamber to a point above the top grids therein, where it is adapted to be connected to means, hereinafter described, for raising and lowering the rod 14 for the purpose of closing and opening the discharge passage 12. The extreme lower end of the rod 14 is provided with a collar 15 which is adapted to slide up and down against a flange on cylindrical cup 16 fastened to the bottom of a sludge chamber 17 which is formed by a continuation of the wall of the filter tank 10. Sludge chamber 17 is provided with a man-hole 18 for removing the sludge after the valve-disk 13 has been raised to closed position. A removable plug or other device 19 may be provided for drawing off a surplus of liquid that may accumulate in the sludge chamber 17. A similar plug or other device 20 may be provided for the filter chamber to drain the same when the filter cake is to be rejuvenated by hot air or to be removed from the filtering tank. The filtering tank may also be provided with a pressure gauge 21.

Attached to the rod 14, at a point close to the conical bottom 11, is a two-arm scraper 22, this scraper being positioned on the rod at a point where it will make contact with the conical bottom when the valve 13 is opened, so that when the rod 14 is rotated, the scraper arms (which are desirably curved) will gather any spent filter cake that may have fallen upon the bottom and converge it into the opening 12, said scraper arms being inclined upwardly and outwardly at the same angle as the upper surface of the conical bottom.

The tank 10 is provided with a cover 23 which is removably fastened in place by any suitable means, such, for instance, as toggles 24, and a suitable gasket is employed to insure against leakage under pressure. This cover is provided at one side with a lateral lug 25 having a hole through which extends a stationary post 26, the lug being slidably mounted on the post so that the post acts as a guide when the cover is raised or lowered and also acts as a vertical pivot to enable the cover to be swung to one side out of the way when it is removed from the tank. For raising and lowering the cover of the tank, I provide a hand-screw 27 swivelled at its lower end to the cover and threaded through a boss carried by a bracket 28, this bracket being pivotally mounted upon the post 26 and positioned to rest on collars 29 fastened to the post. I make further use of the post 26 for raising the grid structure out of the tank and for lowering it into the tank; for this purpose I mount on the post a cable 30 having a grid-engaging hook 31 on its depending end, this cable being carried over pulleys 32 at the top of the post and extending down to the bracket 33 slidably mounted on the post 26, the end of the cable being attached to this bracket. By sliding the bracket down and up on the post, the grid structure may be readily taken out for cleaning and repairs and replaced. Any suitable means may be employed for raising and lowering the bracket 33. For this purpose I show an electric motor 34 whose shaft is provided with a pulley 36 over which runs a belt 37. This belt also runs over a pair of pulleys 38 and an idle pulley 39, said pulleys 38 being loosely mounted on an upstanding shaft 40 whose upper end is threaded and arranged to work through a threaded hole in the bracket 33. A pair of clutches 41 is slidably mounted on the shaft 40 and connected by an operating yoke 42 so that either pulley 38 may be clutched to the screw shaft 40 by simply sliding the double clutch upwardly or downwardly on said shaft 40. With this simple device the labor of removing and replacing the grid structure is rendered easy. The cover may be provided with a covered inlet at 43 to permit filter-aid to be dumped into the tank when it is desired to facilitate or hasten the building up of the cake on the grids. The cover may also be provided with a valved pipe 44 to permit excess air to be released. The liquid to be filtered is delivered to the bottom of the tank by means of an inlet pipe 45 to which is connected the usual pumping plant 46 to enable the liquid to be forced into the tank under pressure. The pipe 45 passes through the wall of the tank and extends across the tank at a point just above the scrapers 22, and this portion of the inlet pipe is perforated along its length to deliver the liquid into the tank in the form of a multiplicity of jets; and in order that these jets shall create a swirling motion upwardly, I place the jets at one side of the center of the tank on one face of the pipe and the jets on the other side of the center of the tank are on the opposite face of the pipe. By arranging the perforations in this manner, the jets are obviously so disposed that they cause a swirling action of the liquid and thus insure that the filter-aid carried thereby shall be distributed as uniformly as possible upwardly amongst the grids supported above, thus insuring as nearly as possible the substantially uniform thickness of the filter cake.

I apply a heater 47 to the inlet pipe and connect the inlet pipe by means of a valved pipe 48 to a blower 49, this blower being driven by a belt 50 running over a pulley 51 carried by the shaft of the motor 34. With this mechanism, I may, after shutting off the supply of liquid to the inlet end of the pipe 45 and draining the liquid from the tank, force into the tank a blast of hot air to thus enable me to dry out the filter cake while on the grids. It is well understood that moisture carried in the filter cake offers the principal resistance to the passage of solvent therethrough, and it is obvious therefore that a simple mechanism for drying out the cake from time to time has an important advantage in that it enables me to quickly and easily, and as often as necessary, rejuvenate the filter cake without dismantling the apparatus. It will be noted that the utilization of my specially formed inlet pipe, with its oppositely arranged sets of jets, insures that the heated air will be swirled upwardly amongst the grids and thus materially hasten the drying out operation. The air inlet pipe 48 is provided with a valve 52 to enable the blower to be cut off while the filter is in operation as a filter. It will be understood that the heater 47 is not in use during the filtering operation, except when it is desired to heat the liquid during filtering operation.

The grid structure consists of a series of segmental grids 53 of the leaf type supported vertically within the tank upon an outlet-pipe frame consisting of two pipes 54, 55 affixed together and having communication with each other. One end of the longer pipe 54 rests upon a lug 56 fastened to the interior of the tank and the other end of this pipe is attached to the wall 10 of the tank by means of a threaded pipe section 57 which extends through a hole in the wall and is threaded into the end of said pipe 54, the outer end of this pipe 57 being threaded and provided with a nut 58, and washer 59 to make a fluid-tight joint at this point, it being understood that the filtered solvent makes its exit through the pipes 54 and 57. The ends of the cross pipe 55 are supported on lugs 56' fastened to the wall of the tank. By removing the short pipe section 57, it will be seen that the outlet pipes 54—55, together with all the superposed grids, may be readily lifted out of the tank.

The arcuate grids are arranged within the tank so as to form a continuous spiral channel extending from the free end of the innermost grid to the unsupported end of the outermost grid, thereby providing a maximum of grid surface to receive the filter cake and also to facilitate the removal of the filter cake from the grids while the same are in situ, as more fully hereinafter set forth. Each grid is provided at one of its vertical edges with a hollow post consisting of two channel irons 60 fastened together and closed along their outer edges by plates 61 and separated along their inner vertical edges to provide a vertical inlet-slot for the filtered solvent. The filtered solvent enters this vertical slot and flows down the hollow post and makes its exit through a nipple-like extension 62 at the bottom end of the post. This nipple 62 fits down into a hole formed in one of the outlet pipes 54—55. To fix the grid in position in the filter, it is necessary to insert the nipple 62 into the hole in the outer pipe and permit it to rest on the pipe. To facilitate the replacing of the grids, I provide the outlet pipes with a vertical squared rod 63 and also affix to each nipple 62 an arm 64 having a hole at its free end that enables it to slide down on the rod 62 and rest either upon one of the outlet pipes or a previously-positioned arm 64 on an adjacent grid, as shown particularly in Figs. 3 and 4. The arm 64 and the rod 63 mainly facilitate the proper positioning of the grids but in addition they tend to hold the grids upright and in proper position with respect to each other.

It will be understood that the arcuate grids may be built up in any suitable manner so long as they are so constructed that the solvent liquid cannot enter the inlet slot of the post until it has been filtered through the filter cake carried by the grids. I have illustrated the preferred method of making these grids. This method consists in employing a base sheet 65 of heavy wire mesh and applying to each face thereof a fine wire mesh 66 and placing over these screens a fabric cover 67, this fabric cover being of the kind usually employed for receiving the filter cake. In this way, a strong and durable grid is formed with a sufficient channel space between the fine screens 66 to conduct the filtered liquid into the vertical inlet slot of the post. This structure is advantageous for the reason that it is rigid enough to be self-sustaining so that it needs to be supported only at the edge carrying the hollow post.

The vertical edges of the three wire mesh sheets extend into the vertical slot of the post and they are held therein by means of a pair of vertical bars 68 which are attached by screws 69 to one or more plates 70 which extend into the inlet slot of the post and are each provided with a screw bolt 71 extending through the outer wall 61 of the post and provided with a thumb nut 72. The bolt 71 and its thumb nut enable the bars 68 to be drawn hard against the inner face of a post to thus enable the vertical edges of the cover or bag 67 to be clamped to said inner face to thereby hold all the parts of the grid in assembled relation and in such manner as to prevent unfiltered solvent reaching the inlet slot of the post.

The screen sheets are cut away to receive the plates 70 and for convenience in assembling and disassembling the parts of the grid, I make that part of the face plate 61 through which the bolt 71 passes in the form of a removable block 72 so that by taking out the screws 69 the plates 70 may be withdrawn through the opening made by removing the plugs 72 and thus disassembling the entire grid structure. The cover or bag 67 is constructed as shown in Fig. 5, that is, in the form of a bag with a single mouth which mouth is reenforced by a heavy cord 73. This corded mouth-edge or hem is clamped against the post by means of the aforesaid bars 68, thus insuring against entrance of unfiltered solvent into the post. The screen structure is desirably tapered from the post toward a free end of the screen structure and the sack or bag is similarly tapered, the purpose of thus tapering the structure of the screen being to enable the bag to be readily slipped on and off the screen formation. The vertical edges of the clamp bars 68 adjacent the post are rabbetted to better hold the corded bag mouth. It will be understood that the grid structure may be greatly varied without departing from my invention. I may even do away entirely with the cloth cover and use instead simply a fine wire mesh screen 66 or one or more additional fine screens. It will be observed that my screen structure enables the grid to be readily curved into arcuate form and to have its curvature changed to suit the position of the grid in the filtering chamber. It will be observed that the two inner sets of grids are bent to substantially semi-circular shape, whereas the two sets of outer grids are bent to a larger circumference, this being of course necessary to carry out the spiral channel idea. This spiral arrangement also requires that there shall be three grids in the outer turns of the spiral, whereas the inner turns of the spiral will have but two grids in each turn. The increase in the number of grids in the larger turns of the spiral formation is advantageous in that it enables me to standardize on a single size of grid section and render the sections practically interchangeable, thus minimizing the cost of manufacturing the grids, and also use grid covers 67 of standard size.

Surrounding the tubular rod 14 is a hollow shaft 74 whose lower end rests on the outlet pipe 54, this tubular rod or pipe being adapted to be rotated by a suitable means hereinafter described. Projecting laterally from this hollow shaft 74 is a horizontal rod 75, the inner end of this rod 75 being removably attached to tube 74 and the outer end of the rod extending to a point beyond the outer edge of the spiral. I suspend on this rod a vertical brush 76 and surrounding the rod is an expansible coil spring 77 which normally forces said brush outwardly on the rod 75. When the rod 75 is placed in its socket in the tube shaft 74 and the vertical brush 76 is positioned to be normally pressed against the inner face of the innermost grid segment, it will be observed that by rotating the tube 74 counterclockwise the brush will first brush the spent filter cake off the inner face of the innermost grid section, then pass to the inner face of the next inner grid section, and thence pass into the inner mouth of the spiral channel and then as it moves around the channel will brush off the spent filter cake on both faces of the grids; then as the brush is carried around the spiral channel to the outer end thereof all the facing surfaces of the grids will be cleaned of cake, and then by continuing the rotary movement of the brush, the outer faces of the outermost segments will be finally cleaned. After the cleaning operation, the brush and its attached parts may be removed from the filtering tank by simply slipping the rod 75 out of its socket on the tube 74. As the spent cake falls to the conical bottom the scrapers, which will desirably be operated at the same time, will gather up the spent cake and deliver it into the sludge tank below through the opening 12.

The valve 13 is held tightly closed by means of a rod 78 which depends through a stuffing box in the center of the cover and is adapted to be drawn upwardly by means of a handle nut 79 threaded on that portion of the rod which extends above the cover and bears rotatively upon the top face of the cover. The lower, inner end of the rod is provided with a pair of depending oppositely-turned hooks 80 which are adapted to engage under lateral pins 81 carried by the upper end of the rod 14. By turning the nut 79 in one direction, the rod will be drawn upwardly and the hooks 80 will engage under the pins 81 and thus pull the rod 14 upwardly until the valve 13 comes forward to its seat. The collar 15 also is pulled up against the top flange of the guide cylinder 16, thus tying all the parts rigidly together. This tying of the bottom of the filtering chamber to the lid by means of stress-absorbing elements obviously enables the use of any given internal pressure in the filter with a minimum weight of tank and bottom and cover, thus enabling me to build a high pressure filter with a minimum weight of metal.

By turning the handle nut 79 in the opposite direction, the rod 78 is lowered to thus permit the valve 13 to open for the purpose of discharging the sludge, as heretofore described. Should the rod 78 be held too tightly by the stuffing box, the rod 78 may be pushed downwardly by hand. When the valve is fully opened the scraper blades 22 will rest upon the conical bottom and then when the rod is rotated, the scraper blades will gather the sludge resting on the bottom and converge it to the opening 12. This rotation of the rod 14 is accomplished by rotating the handle nut 79 in the opposite direction to cause it to rise up on the screw threaded part of rod 78 until it jams against stationary stop nut 82, mounted on the upper end of the rod 78. After this jamming takes place, the continued rotation of the handle nut 79 in the same direction causes the rod 14 to rotate to thus put the scrapers in operation, a few turns of the rod being all that is necessary to clean off the bottom. In this operation the valve 13 also rotates, but this will do no harm and may possibly do good in that this rotation of the valve will help to discharge the sludge from the upper face thereof.

When it is desired to perform a brushing operation, with the vertical rotating brush 76, the rod 78 is lowered far enough to cause its hooks 80 to engage pins 83 carried by the tubular shaft 74, whereupon by continued turning of handle nut the brush 76 will be carried around bodily through the spiral channel between the grids. In this action, the hooks will still be in engagement with pins 81 and thus will also carry the scraper around. This will do no harm. It will be understood that any other suitable mechanism may be employed for actuating the valve and scraper, as well as the brush, without departing from my invention.

To constantly maintain equalization of pressure between the sludge chamber 17 and the interior of the tank 10, I may connect the said two chambers by means of an air pipe 96, this air pipe extending from the sludge chamber to a point above the grids. This pipe permits air that may accumulate in the sludge chamber to be discharged from the filtering chamber at a point under the cover, thereby permitting the air in the two chambers to equalize while the valve 13 is closed. This permits a rather light construction of the cone bottom 11 as all tendency to distort this bottom by unequal pressure is eliminated.

In Fig. 12 a preferred manner of supporting the brush 76 is illustrated. The tubular brush is rotatably mounted on a vertical rod 97. Its upper end is attached to a sleeve 98 slidable on the rod 75. The lower end of the rod 97 is attached to a pair of upwardly-diverging brace rods 99 whose upper ends are attached to sleeves 100 slidably mounted on parallel rods 101 whose inner ends are attached to the tube shaft 74 and whose outer ends are attached to each other and to the rod 75 by the triangular plate or bar 102. With this construction, the brush may move radially inwardly and outwardly without material friction and without tilting, so that effective cleaning action can be accomplished. It is believed that a rolling action of the brush will be sufficient to clean the cake from the grids, as I have found that by reason of my method of circulating or whirling the filter-aid carrying solid amongst the grids, the cake formed on the grids is sufficiently fluffy and soft to be very easily removed.

The pipe 45 which discharges the fluid to be filtered into the chamber is supported at a level spaced materially above the bottom of the chamber. That leaves a bottom space in the chamber in which may accumulate heavy solid matter precipitated from the fluid and from the grid surfaces. In order to prevent rapid pressure build up in the filter it is desirable to prevent deposit upon the grid surfaces of heavy clogging matter such as moisture-saturated particles of filter powder or particles of said powder which have absorbed chemicals often present in the fluid. The provision of settling space for said matter below the level of discharge of the fluid from the pipe 45 enables the matter, when once precipitated, to remain out of the volume of fluid circulated over the grid surfaces and thereby prevents deposit of the matter upon said surfaces.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

It will be understood that in the claims, the term "definitive type" is used to designate a pressure filter of that type wherein the liquid to be filtered is forced into a tank under pressure, a suitable foraminous diaphragm or screen being arranged in the tank through which the liquid carrying a filter-aid is forced, the filter-aid being of such nature that it coats the foraminous diaphragm or "screen surface" with a filter cake which serves as the filtering medium, the filtered liquid being delivered at the other side of the filter cake thus built up and conveyed to a point outside of the filter.

I claim:

1. A pressure filter of the definitive type set forth, a sludge chamber arranged under the filter chamber, the bottom of the filter chamber being dished toward a central opening in the bottom, a reciprocatory rotary rod carrying a valve for said opening, means for reciprocating as well as rotating said rod, and a scraper carried by said rod adapted to scrape the sludge on the dished bottom and deliver it to said opening.

2. A pressure filter of the definitive type set forth, the bottom of the filter chamber being provided with a discharge opening, a sludge chamber in communication with said discharge opening, a vertically movable valve to operate with this discharge opening, a rod carrying this valve and extending upwardly through the filter chamber, means attached to the upper end of said rod for not only moving it upwardly and downwardly to close and open the valve but to rigidly tie it to the lid of the filtering chamber, said means embodying a slidable rotatable rod extending through a stuffing box in the lid and provided with means at its lower, inner end for engaging the valve rod to enable the valve rod to be raised in closed position, and means exterior of the lid for engaging said rod to cause the same to be pulled upwardly to thus close the valve.

3. A pressure filter of the definitive type set forth, the bottom of the filter chamber being provided with a central discharge opening, a sludge chamber in communication with said opening, a valve in the sludge chamber controlling said opening, a central rod carrying said valve extending upwardly through the filter chamber, a scraper carried by said rod for the purpose set forth, means adaptable to be connected to the upper end of said rod for raising and lowering it, as well as rotating it, said means embodying a rod sliding through a stuffing box in the center of the lid and provided at its inner end with means for engaging said rod to raise and lower it as well as rotate it, the upper end of said rod extending above the lid and being threaded, and a threaded operating member mounted on said rod above the lid.

4. In a pressure filter of the definitive type set forth, the screen or grid consisting of a plurality of vertically arranged grids positioned and curved to form a spiral channel between them and means for cleaning the cake from said grids while in situ embodying a central vertical shaft operable from the exterior of the filter casing, a removable lateral rod carried by said shaft at a point above the grids, a depending brush carried by said rod, and a spring on said rod for normally forcing said brush outwardly toward the side wall of the filter tank.

5. In a filter including filtering grid means of the leaf type curved to define a spiral channel between opposed spaced cake-supporting grid surfaces, a grid-cleaning element to traverse said channel and remove cake from said surfaces, a supporting and operating device for said element extending radially of the axis of said channel and having a connection with the element permitting the latter to shift radially of said axis, a mounting supporting said operating device for revolution about said axis, and means to revolve said device about said axis to cause the grid-cleaning element to traverse the spiral channel.

6. In a filter including filtering grid means of the leaf type curved to define a spiral channel between opposed spaced cake-supporting grid surfaces, a grid-cleaning element to traverse said channel and remove cake from said surfaces, a supporting and operating device for said element extending radially of the axis of said channel and having a connection with the element permitting the latter to shift radially of said axis, a mounting supporting said operating device for revolution about said axis, means to revolve said device about said axis to cause the cleaning element to traverse the spiral channel, and spring means constantly urging the cleaning element in one direction radially of the spiral channel.

7. In a filter having a horizontal outlet conduit for filtered fluid and an upright removable grid unit of the leaf type having opposite filtering side walls and adapted to filter through said walls to the interior of the grid unit, the unit having an outlet nipple at its lower edge and said conduit having an inlet hole at its upper side to receive said nipple, a fixed upright guide rod extending above said hole in the conduit and laterally offset from the hole, and a lateral guide projection borne by the grid unit and apertured to slidably receive said guide rod and cooperate with the rod to direct said nipple downwardly directly to said conduit hole, in the replacement of the grid unit.

8. A filtering apparatus comprising a filter chamber with filtering grid means therein spaced upward from the bottom of the chamber, means to discharge fluid to be filtered into said chamber from a level below the grid means and impart a swirling movement to the fluid, for upward flow of the fluid over the grid means, said fluid discharge level being spaced above the bottom of the filter chamber to afford a settling space in the chamber and permit a deposit of heavy solid matter precipitated from the fluid and from the grid means to accumulate in the settling space, a sludge-receiving chamber beneath the bottom of the filter chamber, said bottom having a discharge aperture opening from the filter chamber into the sludge-receiving chamber, means operable from the exterior of the filter to open and close said discharge aperture, and a scraper device below the grid means and operable from the exterior of the filter to discharge deposit in the bottom portion of the filter chamber through said discharge aperture to the sludge-receiving chamber.

9. A filtering apparatus comprising a filter chamber with a filtering grid structure therein of the leaf type with upright grid surfaces curved horizontally, means to discharge fluid to be filtered into said chamber at a level for upward flow of the fluid over the grid surfaces and impart a horizontal rotary swirling movement to the fluid in its upward travel over the grid surfaces, the grid structure being curved horizontally to conform substantially to the swirl of the fluid, means to support the grid structure in the filter chamber to afford a free space surrounding the grid structure and a free space enclosed by the grid structure and free spaces above and below the grid structure in direct and free communication with said surrounding and enclosed spaces, a sludge-receiving chamber beneath the bottom of the filter chamber, said bottom having a discharge aperture opening from the filter chamber into the sludge-receiving chamber, and means operable to open and close said discharge aperture.

10. A filtering apparatus according to claim 9, characterized in that the horizontal curvature of the grid structure is spiral and includes several convolutions.

BLAINE KELLEY.